(12) United States Patent
Plestid et al.

(10) Patent No.: US 10,743,190 B2
(45) Date of Patent: Aug. 11, 2020

(54) SYSTEM AND METHOD FOR NETWORK STRANDED REMOTE RADIO INSTALLATION

(71) Applicant: MAVENIR NETWORKS, INC., Richardson, TX (US)

(72) Inventors: Thomas Leonard Trevor Plestid, Ottawa (CA); Erik Boch, Ottawa (CA); Tony Fook Nyau Wong, Ottawa (CA)

(73) Assignee: Mavenir Networks, Inc., Richardson, TX (US)

( * ) Notice: Subject to any disclaimer, the term of this patent is extended or adjusted under 35 U.S.C. 154(b) by 0 days.

(21) Appl. No.: 15/905,868

(22) Filed: Feb. 27, 2018

(65) Prior Publication Data

US 2018/0249346 A1    Aug. 30, 2018

Related U.S. Application Data

(60) Provisional application No. 62/464,066, filed on Feb. 27, 2017.

(51) Int. Cl.

| | |
|---|---|
| *H04W 16/24* | (2009.01) |
| *H04L 29/12* | (2006.01) |
| *H04W 76/10* | (2018.01) |
| *H04W 24/02* | (2009.01) |
| *H04W 84/04* | (2009.01) |
| *H04W 88/02* | (2009.01) |
| *H04W 88/08* | (2009.01) |
| *H04W 88/18* | (2009.01) |

(52) U.S. Cl.
CPC ......... *H04W 16/24* (2013.01); *H04L 61/2015* (2013.01); *H04W 24/02* (2013.01); *H04W 76/10* (2018.02); *H04W 84/042* (2013.01); *H04W 88/02* (2013.01); *H04W 88/085* (2013.01); *H04W 88/18* (2013.01)

(58) Field of Classification Search
CPC ..... H04W 16/24; H04W 24/02; H04W 76/10; H04W 88/18; H04W 88/085; H04W 88/02; H04W 84/042; H04L 61/2015
See application file for complete search history.

(56) References Cited

U.S. PATENT DOCUMENTS 8,577,334 B1 * 11/2013 Smith ................... H04W 12/08
                                                    455/410
9,913,127 B1 *  3/2018 Polepalli ............... H04W 8/183
(Continued)

FOREIGN PATENT DOCUMENTS

| CN | 101272583 A | 9/2008 |
|---|---|---|
| EP | 1039685 A2 | 9/2000 |

(Continued)

OTHER PUBLICATIONS

International Preliminary Report on Patentability for corresponding international application PCT/US2018/019808, dated Apr. 22, 21 pages.

(Continued)

*Primary Examiner* — Will W Lin
(74) *Attorney, Agent, or Firm* — Ohlandt, Greeley, Ruggiero & Perle, L.L.P.

(57) ABSTRACT

There is provided a system and a method for installing a Remote Radio Unit. The system and method is for a network stranded remote radio installation.

14 Claims, 14 Drawing Sheets

(56) References Cited

U.S. PATENT DOCUMENTS

| | | | |
|---|---|---|---|
| 2005/0007993 A1 | 1/2005 | Chambers et al. | |
| 2010/0312818 A1* | 12/2010 | Oman | H04L 29/1282 |
| | | | 709/202 |
| 2010/0313262 A1* | 12/2010 | Mehta | G06F 8/61 |
| | | | 726/12 |
| 2013/0022033 A1* | 1/2013 | Shi | H04W 48/18 |
| | | | 370/338 |
| 2014/0026207 A1* | 1/2014 | Wang | H04L 41/28 |
| | | | 726/12 |
| 2014/0226736 A1 | 8/2014 | Niu et al. | |
| 2015/0256358 A1* | 9/2015 | Stapleton | H04W 52/245 |
| | | | 370/329 |
| 2015/0382367 A1 | 12/2015 | Yanover et al. | |
| 2016/0315907 A1* | 10/2016 | Nantel | H04L 61/2015 |
| 2017/0086098 A1* | 3/2017 | Kwon | H04W 28/22 |
| 2017/0272273 A1* | 9/2017 | Singla | H04L 12/4633 |
| 2017/0318483 A1* | 11/2017 | Zhang | H04W 88/08 |
| 2018/0287696 A1* | 10/2018 | Barbieri | H04B 7/15507 |

FOREIGN PATENT DOCUMENTS

| | | |
|---|---|---|
| EP | 2509391 B1 | 8/2013 |
| EP | 3038429 A1 | 6/2016 |
| WO | 2016145371 A2 | 9/2016 |

OTHER PUBLICATIONS

International Search Report and Written Opinion for corresponding international application PCT/US2018/019808, dated May 25, 2018, 12 pages.

* cited by examiner

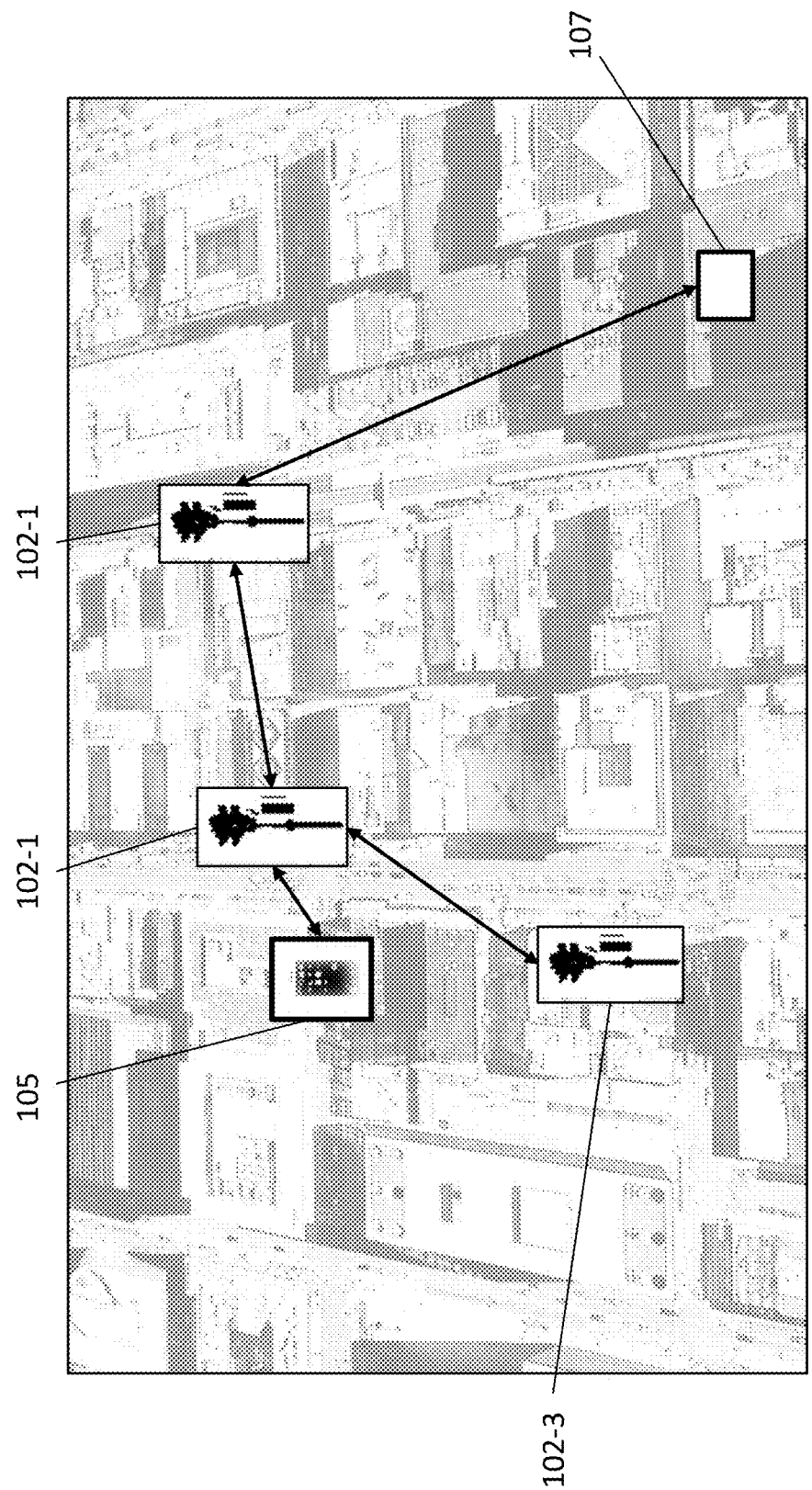

SYSTEM AND METHOD FOR NETWORK STRANDED REMOTE RADIO INSTALLATION

CROSS REFERENCE TO RELATED APPLICATION

The present application claims priority to U.S. Provisional Patent Application No. 62/464,066 filed on Feb. 27, 2017, the entirety of which is incorporated by reference herein.

BACKGROUND OF THE DISCLOSURE

1. Field of the Disclosure

The present disclosure relates to systems, devices, and methods for Radio Access Network cellular networks. More particularly, the present disclosure relates to a system and a method for network stranded remote radio installation.

2. Description of the Related Art

Small cells underlay macro Radio Access Network (RAN) cellular networks for the purposes of network densification.

Small cells must be low cost, so typically are cloud based with a split where the baseband processing is in the cloud. The split is currently at "Layer 0" of Layer 1, that is the physical link or medium layer, so all I/Q "fronthaul" data is transported over a Common Public Radio Interface (CPRI) link that requires tremendous capacity (e.g. 20 Mhz LTE channel translates to ~2.4 Gbs DL).

Because of dense deployments, CPRI is not well suited for small-cell because each Remote Radio Unit (RRU) requires a dedicated dark fiber for every RRU installed. Trenching fiber to a site every 100-200 m increases the operational expenditure costs and total costs of ownership to such a degree that it is only employed in very specific highly underserviced "holes."

SUMMARY OF THE DISCLOSURE

The present disclosure provides a RRU that has a Node Manager configured to communicate to a Central Management System (CMS) that comprises a Deployment System having a web application server. The CMS web application server is configured to interface with an installation application for a personal computing device, for example, a smartphone, tablet, or other mobile computing device. The installation application can be used to implement installation of the RRU configuration for the CMS Deployment System without requiring a direct physical or wireless interface between the RRU and the installer's personal computer device.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description, which is to be read in association with the accompanying drawings.

FIG. 7 shows an exemplary embodiment of a small-cell RRU cluster for a Radio Access Network

DETAILED DESCRIPTION OF THE EMBODIMENTS

Figure 1:
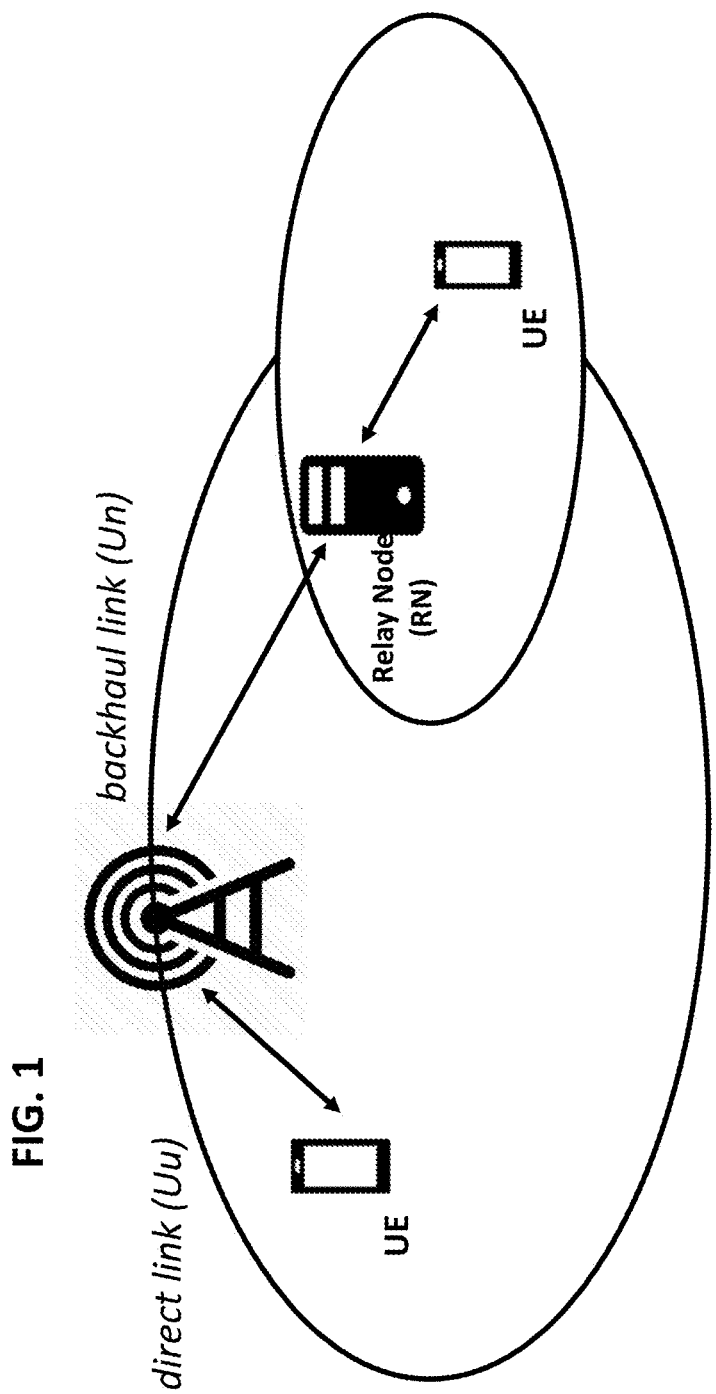
FIG. 1 is a conventional architecture for an LTE-Advanced (LTE-A) relay.

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments can be methods, systems, media, or devices. Accordingly, the various embodiments can take the form of an entirely hardware embodiment, an entirely software embodiment, or an embodiment combining software and hardware aspects. The following detailed description is, therefore, not to be taken in a limiting sense.

The introduction of enabling technologies now allow for the deployment of small cell clusters of approximately 100 m diameter that are interconnected wirelessly, in clusters of ~10, with a single "anchor" point for a fiber connection to the baseband processing units that create a very favorable total cost of ownership in the mass deployment of small cells.

Small cell Base Transceiver Station (BTS) deployments must be mass-deployable. In order to achieve this goal, the following problems arise with current technologies.

Mobile network operators are shifting to cloud technologies in which the baseband processing involved in processing mobile user radio signals/traffic is carried out largely in the "cloud." This shift to cloud technologies removes processing demand on the remote radio unit (RRU) with a goal to simplifying the RRU, making it more easily and cost-effectively deployable. A current problem is that these RRUs are large and complex. Therefore, although the RRU processing demands are reduced, due to the complexity involved in deployment, these RRUs are not mass-deployable.

The use of cloud technologies in the implementation of the Baseband Unit (BBU) relies on high bandwidth communications infrastructure between the BBU and the RRU. Generally, this, in turn, relies on fiber optic transmission systems. The problem with fiber optics is fiber optics are not present in virtually any installation site associated with outdoor small cell deployments. Further, the installation of such fiber optics is costly and time consuming.

As stated above, current Cloud-RAN solutions rely on making the RRUs remote by the use of a synchronous optical interface referred to as the Common Public Radio Interface (CPRI). This interface has strict delay and strict capacity requirements. Further, this interface does not readily allow RRUs to be "networked" onto a common transport infrastructure, such as Ethernet.

When a radio-based interconnection is deployed between the BBU and RRU in cloud-RAN implementation, additional network components are required at each RRU site (i.e. CPRI point-to-point radios). These additional components increase the complexity of the installation and makes obtaining landlord permissions difficult and costly. An example would be the installation of RRUs on city-owned street-light-poles (SLPs) or traffic-light-poles (TLPs).

Described below is at least one embodiment of an integrated RRU of the present disclosure that overcomes complexities of installation (i.e. multiple boxes at the site, cabling, alignment, and the like).

Accordingly, the present disclosure has embodiments that advantageously provide support for the mass deployment of RRUs and RRU clusters, and includes Ability to install RRUs in any order (e.g. a fibered node in an RRU cluster can be installed last).

Installers require only a portable computer or smart phone for Android/iPhone for installation; no craft interface is required for mass deployments.

Installation time of less than 15 minutes.

Direct installs with factory configuration.

Mechanical skill only required for installers.

Out of band communications to stranded RRUs.

The present disclosure also has embodiments that include:

A split at the Remote Radio Units (RRU) that drives the "fronthaul" data down by an order of magnitude as compared to CPRI (20 Mhz LTE channel translates to ~200 Mbs DL); creation of RRU interconnect technology, for example using Wireless Gigabit Alliance 802.1ad standard enabled devices, that builds 3 Gb/s wireless links between RRUs allows for creation of RRU clusters supported by a single fiber connection; and Technology configured to deliver a RAN RRU that delivers 1 Gb/s to User Equipment UEs near a small cell.

The present disclosure has one embodiment that deploys a high-low PHY split on the RAN, which reduces the front haul data rates by an order of magnitude. The present disclosure has another embodiment for a WiGig RRU interconnect, which takes advantage of the lower front haul RAN rates to create RRU meshes.

There have been a few self-cannibalistic systems that use in band capacity to deliver front haul to the core. An example of such systems is shown in FIG. 1, which depicts a LTE-A relay. The "Un" backhaul actually cannibalizes Uu (the air interface between the UE (e.g. smartphone) and the eNB (basestation)) capacity of a Donor eNodeB. WiFi may deploy similar methods to LTE-A relay. Small cells currently are only fibered or copper Ethernet connected, so out of order RRU installation and out of band communications with the RRU are not considered. One other method of RRU fronthaul interconnect is using separate V-band or E-band backhaul radios implementing the front haul connection wirelessly as a non-integrated high capex solution.

Plug and play solutions exist, however the factory default is not what is deployed. Fully qualified Domain Name (FQDNs), and Dynamic Host Configuration Protocol (DHCP)/manually configured IP are often configured in carrier depots prior to physical deployments. Also, because current small cells are expensive to deploy, outdoor units tend to be higher in RF power, in turn this drives up the need for installer RF engineering skills. Typically, conventional deployments demand a significant degree of installer skill for deployment. Also, laptops and craft ports are typically used for manual radio configurations.

In an embodiment of the present disclosure, there is provided an out of band wireless communication medium incorporated in an RRU to allow for a simplified installation and provisioning process by bypassing a need for physical connectivity for the RRU under installation. This wireless functionality allows for installation to be in any order for a wirelessly interconnected RRU cluster, thereby simplifying logistics. Further, stranded RRUs can be always in communication with the network with this out of band method.

This wireless communication also eliminates any requirement for a physical craft port as the out of band method (for example IOT devices or embedded UE modules) can communicate the RRU status to a server while the installer can receive RRU installation status via a standard smartphone browser. No specialized tools are required of the installer.

Because the RRU is provisioned out of band, RRUs can be shipped to the installation site directly from the factory without any need for pre-configuration.

Figure 2:
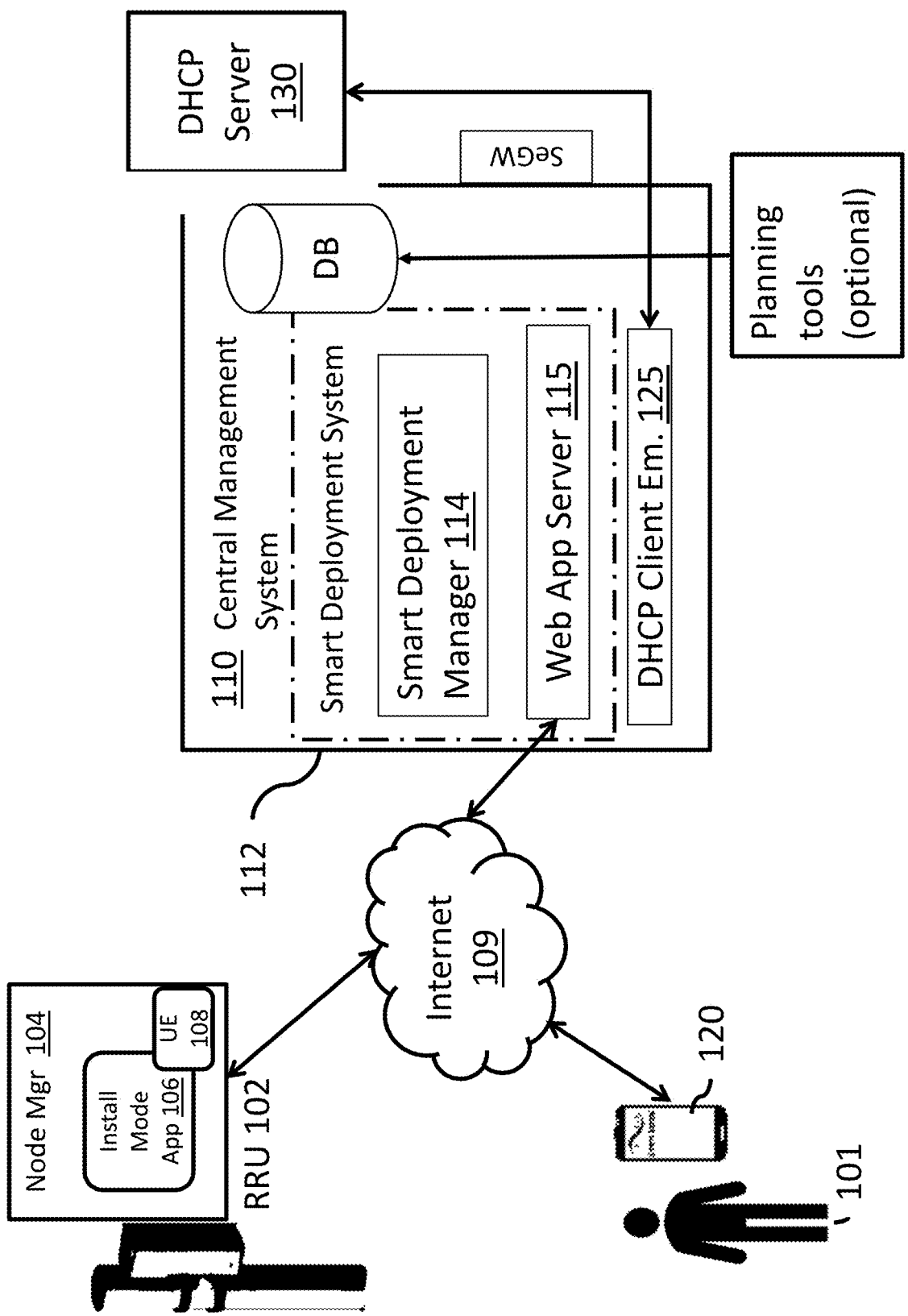
FIG. 2 is an embodiment of a system and component architecture for a RRU and installation flow for a RRU node within a cell cluster of RRUs.

Referring to FIG. 2, a RRU 102 is physically located as a fixture (e.g. on a street pole, side of a building, and the like) and is powered up. The RRU comprises a Node Manager module 104 that includes an Install Mode Application (Install Mode App) 106 and an embedded UE 108 module. As noted herein, optimal placement of the RRU can be at a relatively high or difficult to reach location, such as a traffic light or street pole. A Node Manager 104 tethers to the embedded UE 108 in the RRU, and the UE 108 establishes a cellular IP connection for the Node Manager 106. The Node Manager 106 establishes a secure connection to a Central Management System (CMS) 110. The CMS includes a Deployment System 112 comprising a Deployment Manager 114, which the UE 108 accesses via a network 109 (e.g. Internet). The Node Manager 104 runs Install Mode App 106 to get a basic configuration. The RRU will use LEDs to indicate its status. The embedded UE 108 can be disconnected once the RRU is connected to CMS 110. As such, installers do not need a direct connection to RRU for installation. The installer 101 gets notification on RRU status via an Installation Web Application (Installation Web App) 120 connected to the CMS 110 via Web Application Server 115 and via RRU light emitting diode (LED).

Figure 3A:
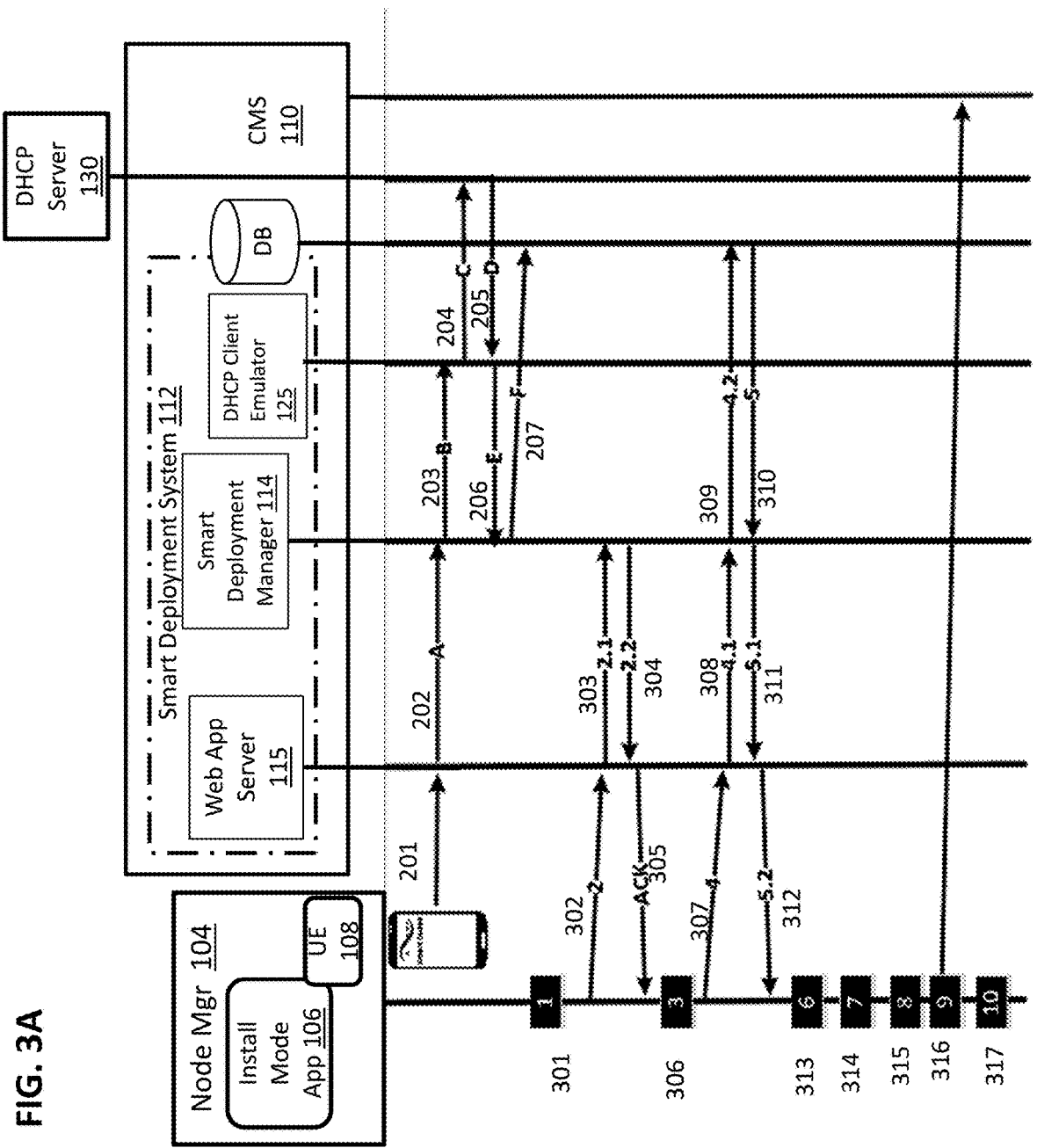
FIGS. 3A-3B show different embodiments of a system flow for an RRU installation.

FIG. 3A illustrates an embodiment of a system flow for an RRU installation. In this embodiment, the system uses a DHCP server for IP address assignment.

After receiving a work order, the installer 101 receives authorization to install a RRU 102 at a planned location. The installer 101 goes to a physical site and mounts the RRU 102 on the lamp post or street furniture at the correct height and orientation as instructed on his/her work order. The installer 101 can connect a wired fiber connection if applicable. The installer 101 then powers the RRU 102 as outlined in the work order.

At operation 201, the installer uses the Installation Web App 120 to access an installation site via the Web App Server 115 and enters the RRU serial number (S/N) in Installation Web App 120, for example by using a web application interface as shown in FIGS. 5A-5F. The scan of the RRU S/N triggers operations 203-207, which operates independently of the installer.

At operation 202, the Web App Server sends the installation message to the Deployment Manager 114. At operation 203, the Deployment Manager 114 uses a DHCP Client Emulator 125 to get an IP address from a DHCP Server 130.

At operation 204, the DHCP Client Emulator 125 requests an IP address.

At operation 205, the DHCP Sever 130 acknowledges the request and provides the information requested, including the IP address, to the DHCP Server 130.

At operation 206 the, DHCP Client Emulator 125 forwards the IP address to the Deployment Manager 114.

At operation 207, the Deployment Manager 114 updates the CMS database.

The installer 101 then powers the RRU 102 as outlined in the work order.

After the RRU 102 powers up, at operation 301, the Node Manager tethers to a UE 108 over a tertiary interface. The UE 108 provides cellular IP connection to the Node Manager.

At operation 302, the Node Manager 106 accesses the Web App Server 115 over a network via the UE 108. At operation 303 the Web App Server 115 send a connection message and at operation 304 the Deployment Manager returns a connection message such that the Node Manager establishes a secure connection to the Deployment Manager 114. At operation 305 an acknowledgement (ACK) message is returned to the Node Manager 106. Other methods and tools beyond a Web App Server 115 may be used to secure a connection to the Deployment Manager 114.

At operation 306, the Node Manager 106 runs so that the Install Mode App 106 can get a basic configuration for the RRU.

At operation 307 the Web App Server receives configuration request from the Node Manager, and at operation 308 the Web App Server sends a message to the Deployment Manager 114. At operation 309, the Deployment Manager 114 queries the database for a basic configuration for the RRU. At operations 310, 311 and 312, the basic configuration is downloaded from the database to the RRU 102 via the Deployment Manager 114 and the Web App Server 115.

At operation 313, the RRU 102 Node Manager 104 replaces a factory IP address for a management interface with the new IP address, and any other required information for RRU basic configuration. This can include the primary management interface and front haul interconnect radio configurations.

At operation 314 the RRU 102 checks a primary interface—for example an SFP-fibered interface, an Ethernet interface, or a wireless (WiGig) interface—to connect to the CMS 110.

At operation 315, if CMS cannot be reached, an RRU Install Mode App 106 uses the embedded UE 108 to inform the Deployment Manager 114 of connectivity status. The Web Application server 115 sends a notification of CMS connectivity to the installation application 120 of the installer's client device (not shown). The RRU continues to attempt verification of the primary interface.

If the CMS can be reached, at operation 316, the RRU 102 establishes the management connection with the CMS. At operation 317, the embedded UE can be disconnected once the CMS can be reached.

Figure 3B:
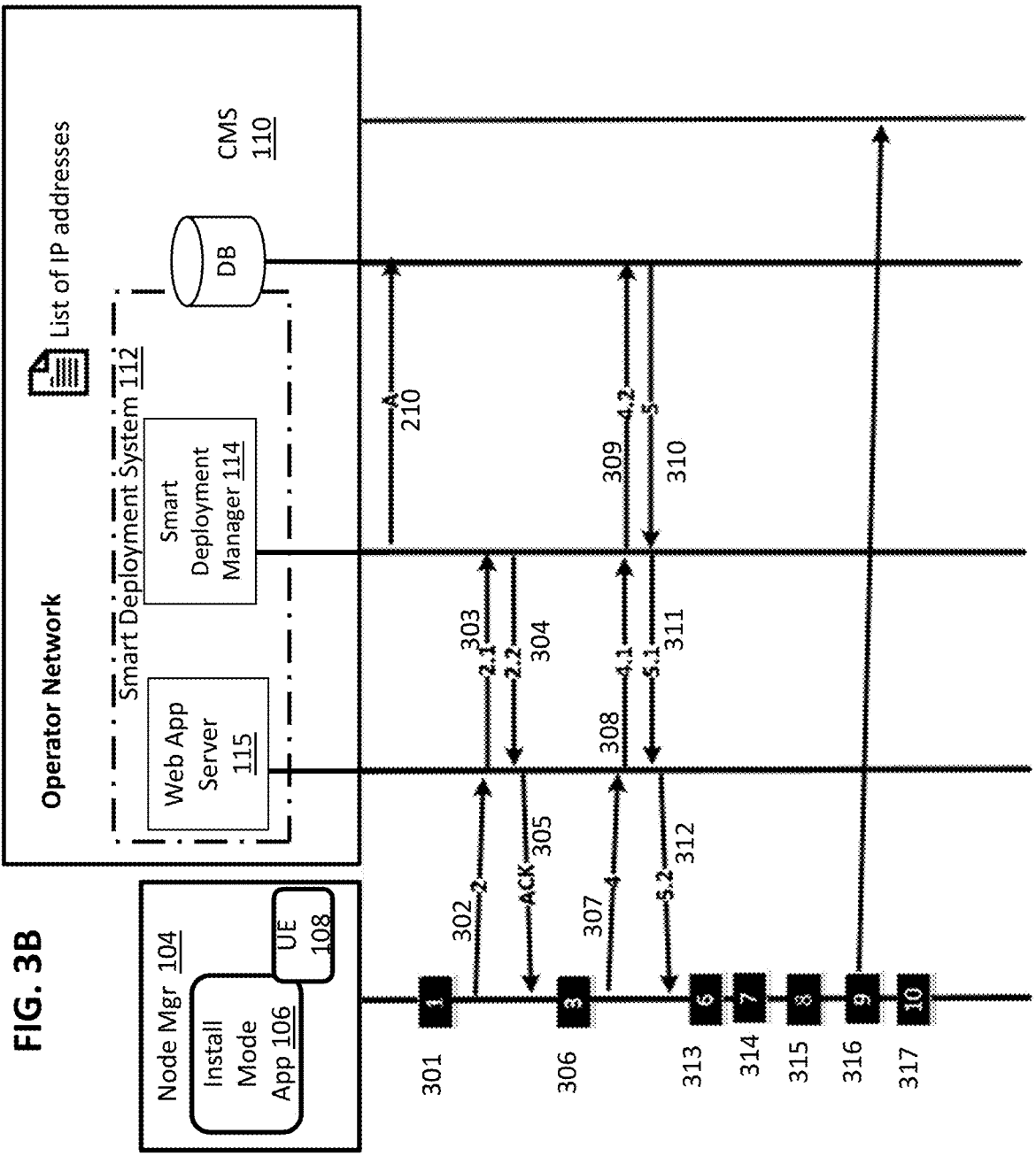

FIG. 3B illustrates another embodiment of a system flow for an RRU installation. In this embodiment, a Static IP is assigned. In the embodiment, IP addresses can be statically assigned to a RRU from a list of available addresses given by the operator. At operation 210, as part of an installation check list, the Deployment Manager 114 will assign all the necessary IP addresses for each RRU in the available inventory. Thus, the installer 101 does not need to configure and connect to the RRU and manually conduct operations 201-207 in FIG. 3A. After the RRU powers up, the system installation flow is the same as that shown with respect to FIG. 3A starting at operation 301 and continuing to operation 317.

Figure 4:
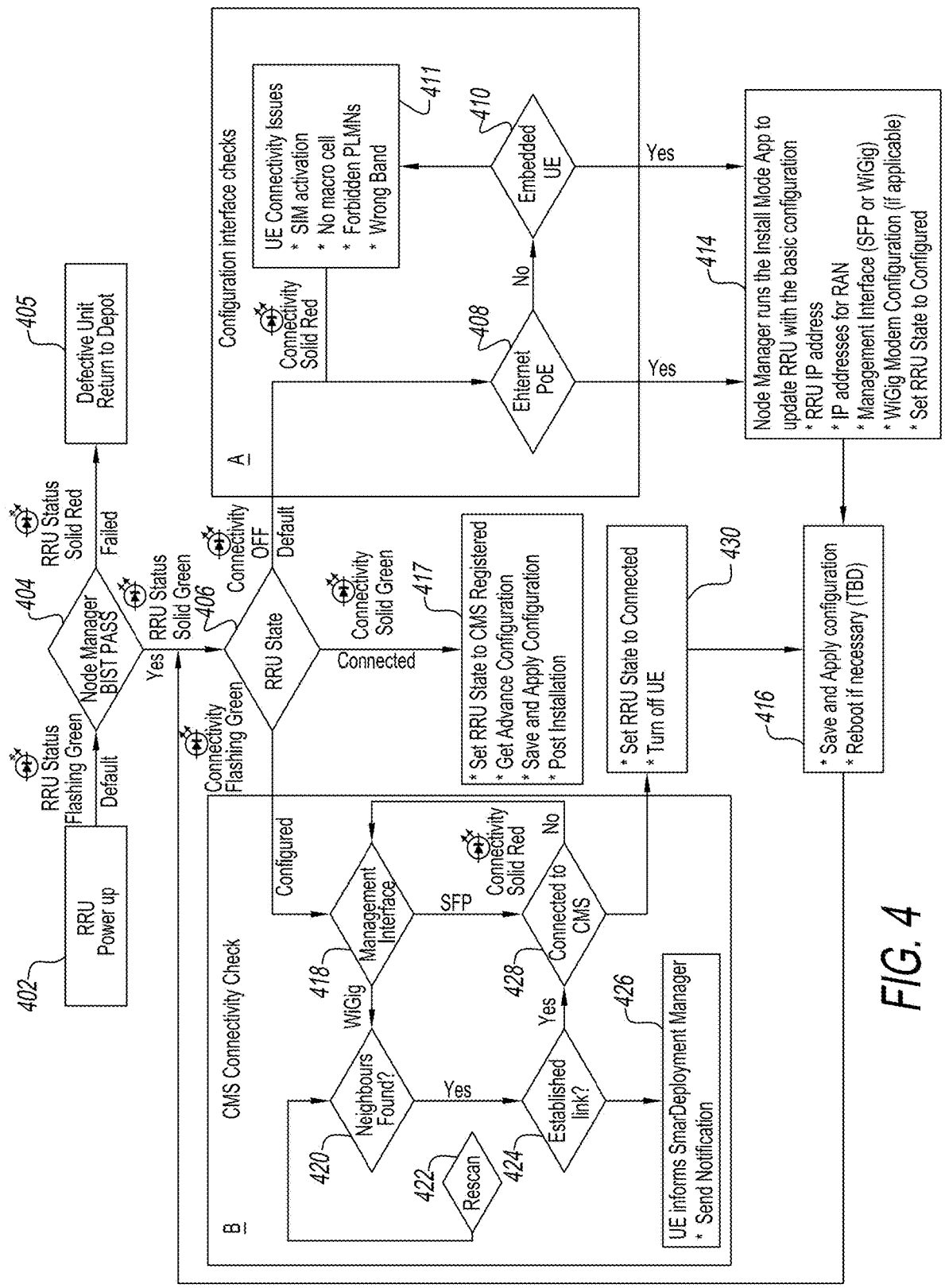
FIG. 4 is a flow chart for a boot up sequence for an RRU.
Figure 5A:
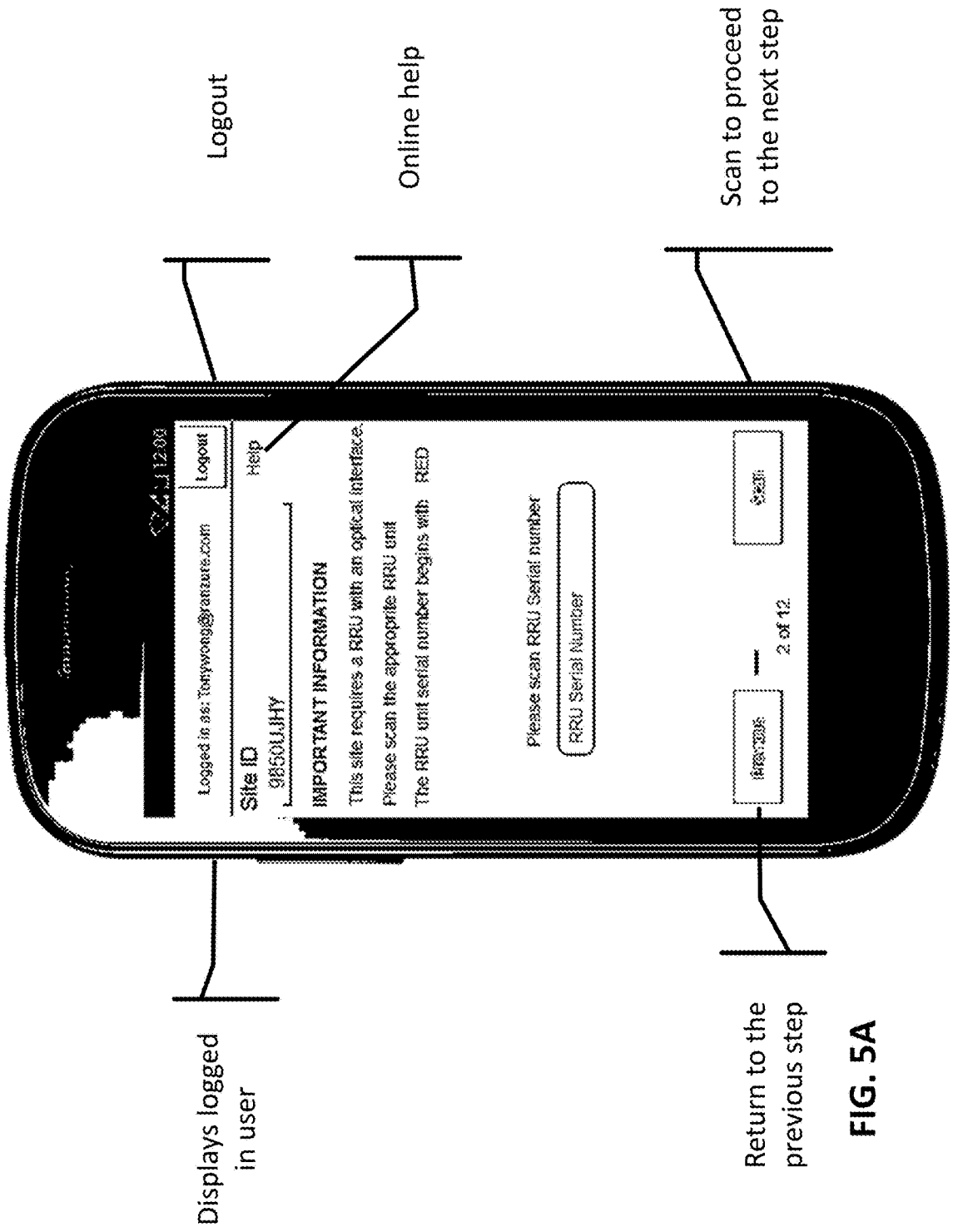
FIGS. 5A-5F show exemplary user interfaces for a mobile installation application for an RRU.
Figure 5B:
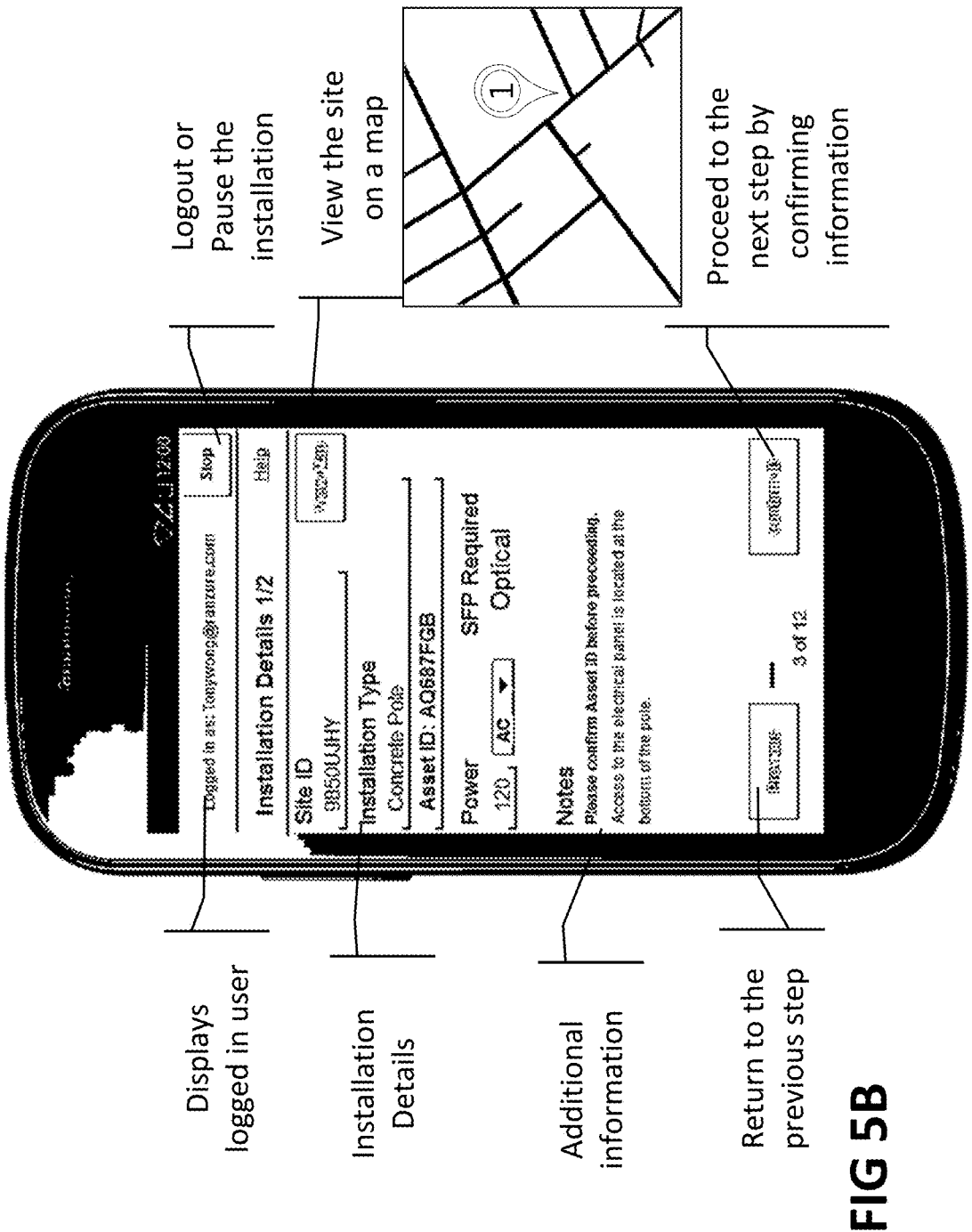
Figure 5C:
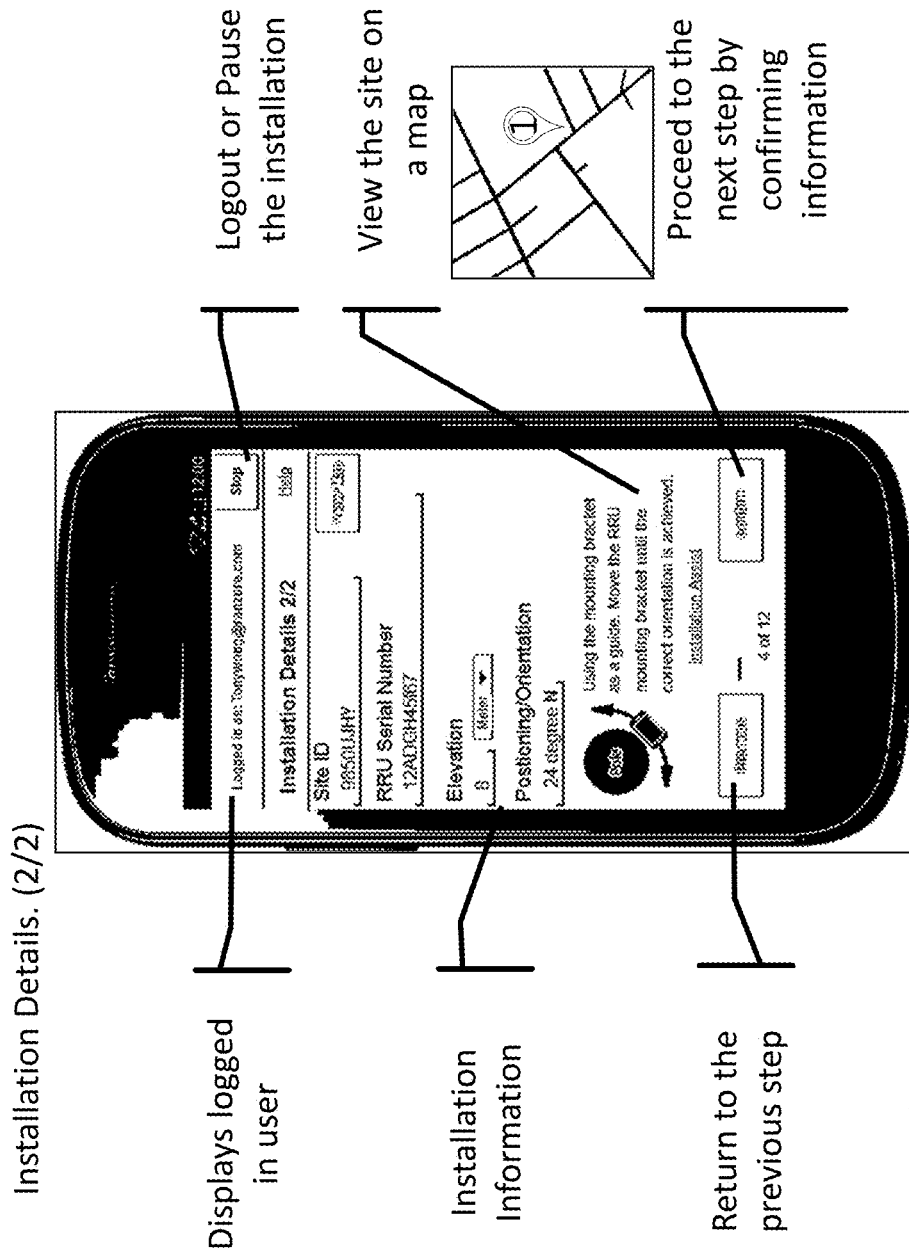
Figure 5D:
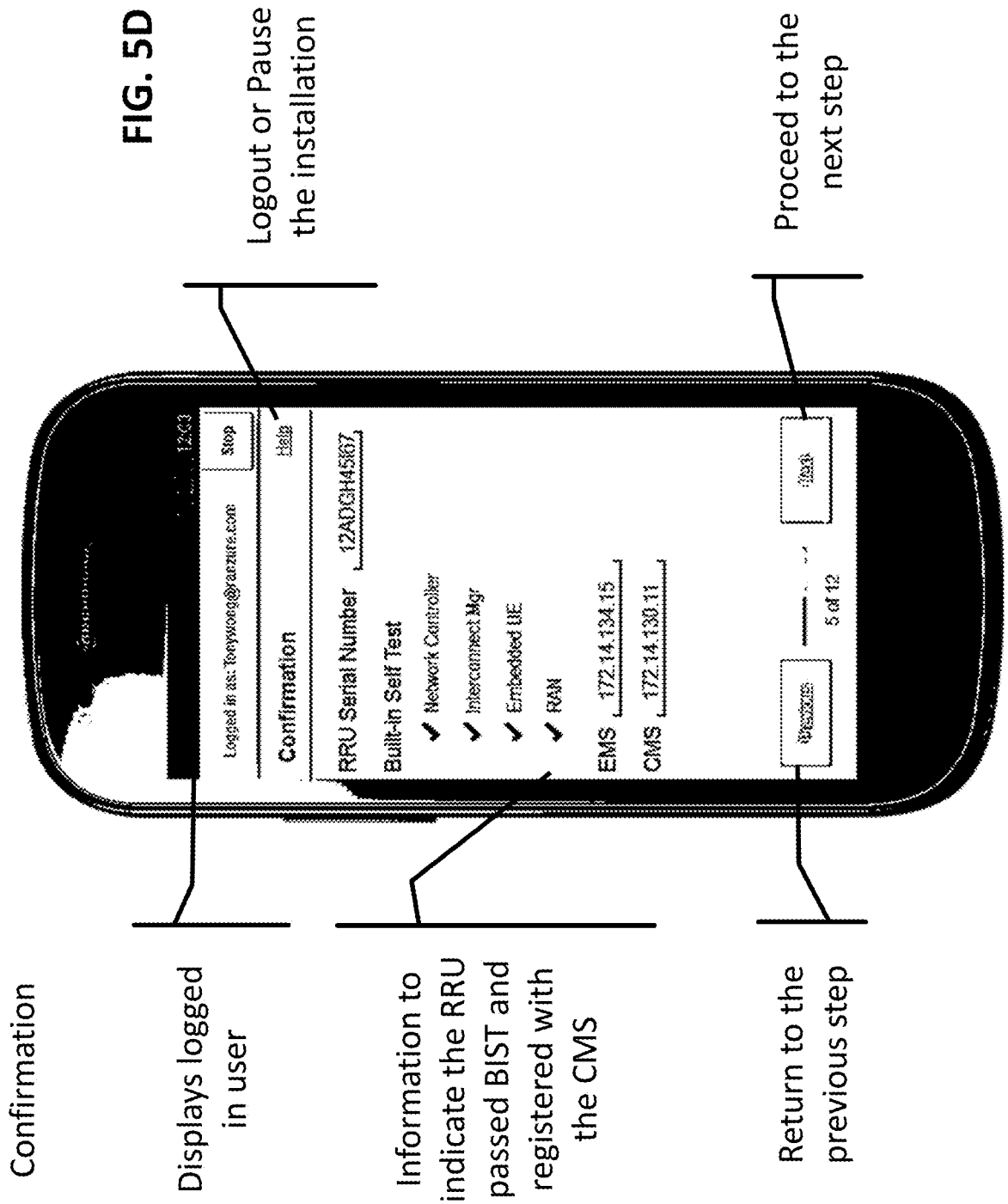
Figure 5E:
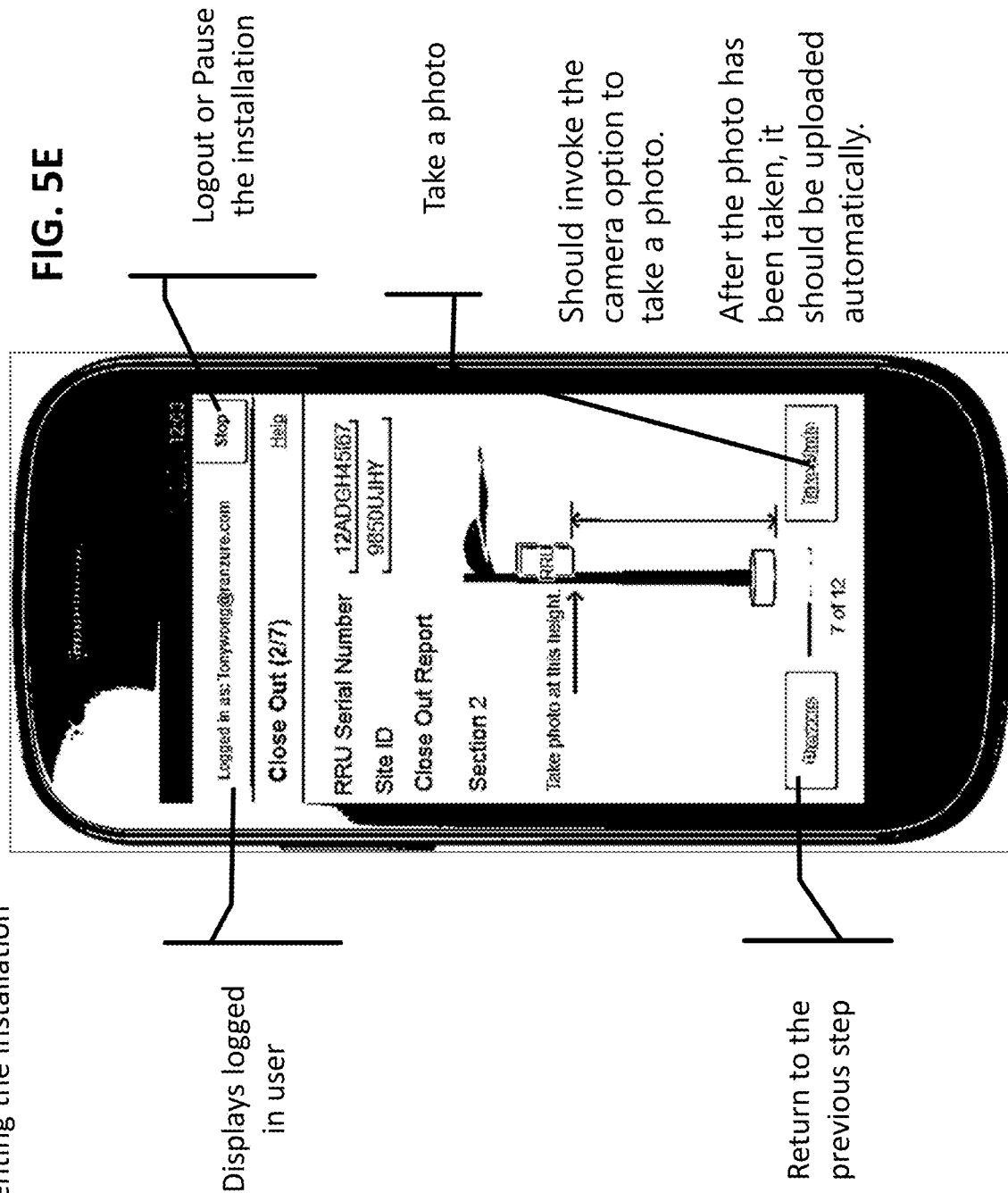
Figure 5F:
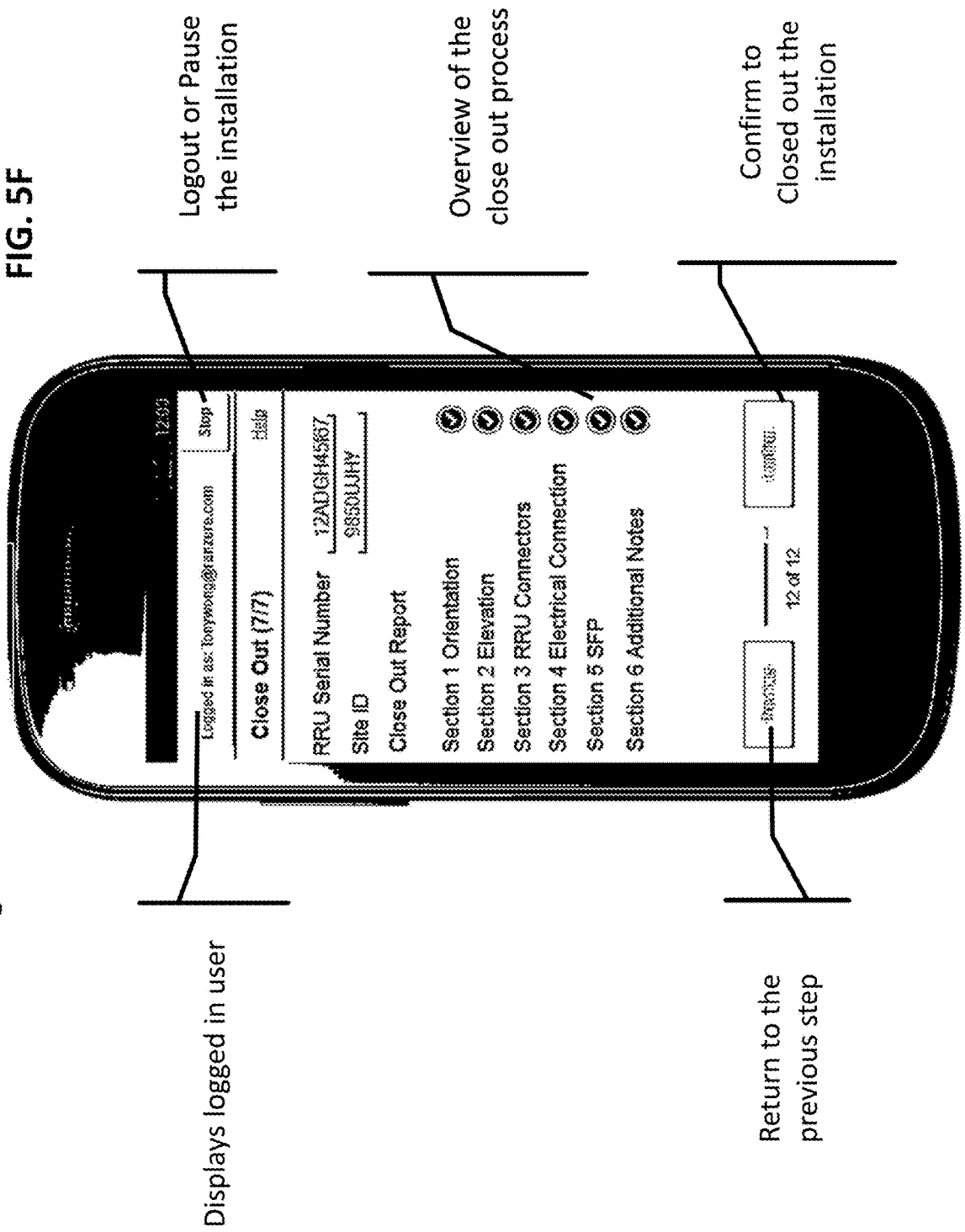

Referring to FIG. 4, at block 402, the RRU powers up. As a default, the RRU indicates it is operational, for example, via a flashing green LED. At block 404, the RRU checks for a Node Manager Built in Self Test (BIST) pass. If not, at block 40, the RRU indicates the unit is defective, for example, via a solid red LED, in which case the RRU needs to be repaired or replaced (e.g. returned to the depot). If the Node Manager BIST passes, the RRU indicates the status (solid green LED) and, at block 406, the RRU begins an RRU State check. The Installer 101 can check the LEDs to confirm that the RRU has power and going through the BIST.

If the RRU State check indicates it is in connected state, block 417 RRU sets the RRU state to CMS registered and gets an Advance Configuration, saves and applies the configuration. Otherwise the RRU performs configuration checks at block A and CMS connectivity checks at block B.

As a default, the connectivity is off and at block A the RRU begins its configuration interface checks. At block 408 the RRU checks if the Ethernet PoE (power over Ethernet) is configured, and if so, at block 414 the Node Manager runs the Installation application to update the RRU with a basic configuration as described herein with respect to FIGS. 3A-3B. In an embodiment, an installer can be physically connected to an Ethernet port of the RRU. In an embodiment, as shown at block 410 the RRU can also employ an embedded UE in the RRU for configuration connectivity Block A, for example if the installer is not physically connected via an Ethernet port. The Node Manager runs the Installation application 106 at block 414 as described herein with respect to FIGS. 3A-3B. If there is no embedded UE connectivity, at block 411 the RRU indicates UE connectivity issues (a connectivity LED flashes solid red), for example, SIM activation is needed, there is no macro cell anchor site, there are Forbidden Public Land Mobile Networks (PLMNs) or the band is incorrect. The Installer 101 can check the LEDs to confirm that the UE has successfully connected to the Deployment Manager 114.

If the RRU passes the configuration interface checks at block A, the Node Manager, at block 414, runs the Installation application 106 to update the RRU with a basic configuration, including an RRU IP address, IP addresses for the RAN, a Management Interface (SFP or WIGig), WiGiG Modem Configuration (if applicable), and sets the RRU state to "Configured." At block 416, the RRU saves and applies the configuration, rebooting if needed. LEDs can be employed to confirm that the RRU has rebooted.

Once configured, at block 406, the RRU state check next passes to a CMS connectivity check at block B, indicated on the RRU by a flashing green LED. The Installer 101 can also get a message (txt or web notification) informing him that the RRU has successfully connected to the Deployment Manager 114 via the web application 120.

If the RRU is already connected to a CMS, at block 417, the RRU sets the RRU state to connected (connectivity, solid green LED) and gets an Advance Configuration, saves and applies the configuration, and posts a report for consumption by the installation application 106.

Figure 6A:
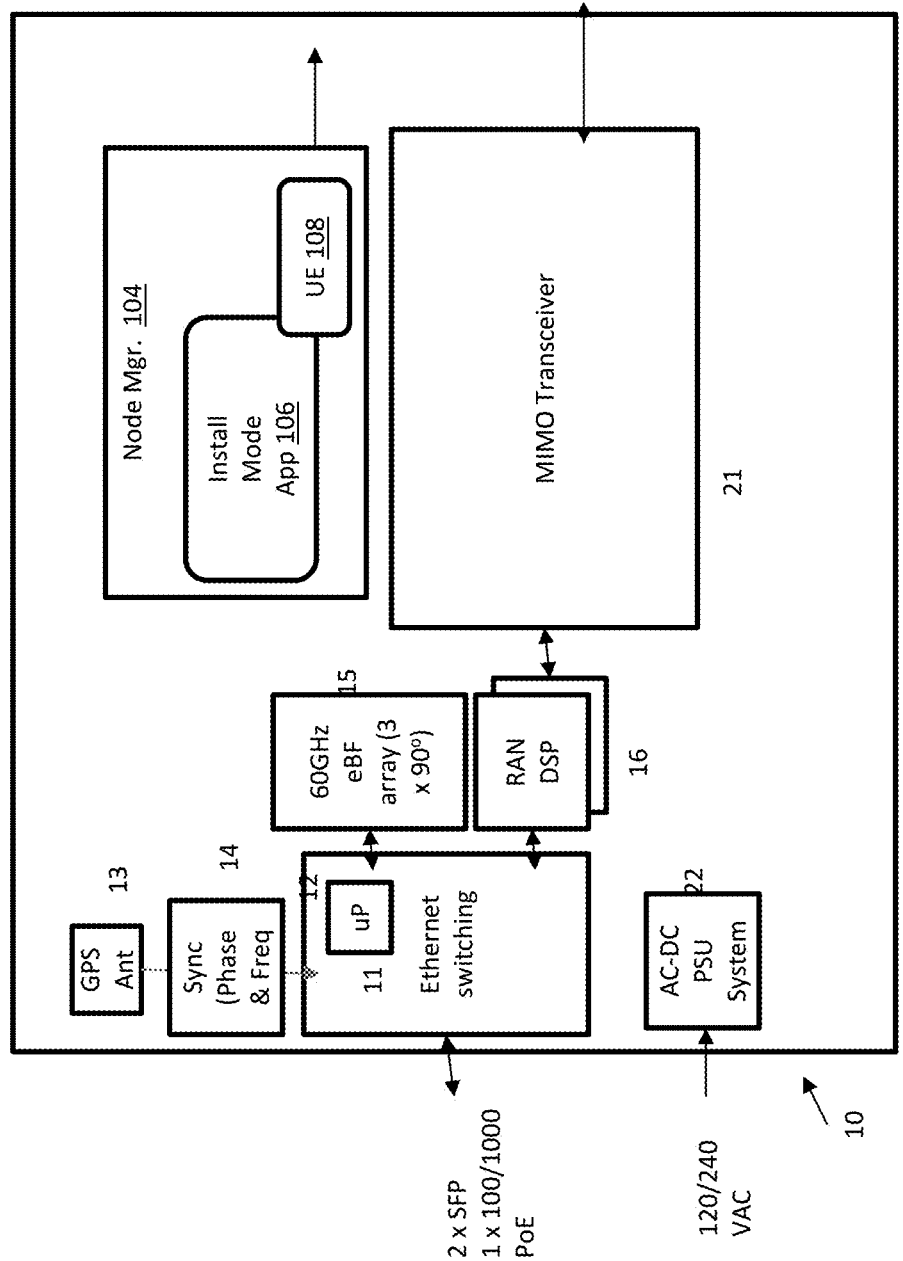
FIGS. 6A-6B, show embodiments of an integrated RRU.

At block 418, the RRU determines if the Management Interface is configured as fiber/copper interface (i.e. via small form pluggable (SFP)) or one of the Wireless (WiGig) interfaces for connection to the CMS. If the RRU is configured for a wireless connection to the CMS (WiGig), at block 420 the RRU scans to determine if there are any neighboring nodes, for example, neighboring RRUs or other connections operatively connecting to an anchor site. An example of an RRU configured with a wireless Ethernet switch is described below with respect to FIGS. 6A-6B. If not, the RRU, at block 422, will continue to scan until detecting to a neighboring node. This indicates the WiGig interface connected to a neighbor but that the neighbor RRU is not operatively connected to an anchor site. When the RRU detects a neighboring node, the RRU, at block 424, determines if a link is established to the CMS. If not, at block 426, the UE informs the Deployment Manager and sends a notification. Also, at block 422, the RRU continues to rescan for a neighboring node. If at block 428 the RRU determines a link to the CMS is established, the RRU, at block 430, sets the RRU State to Connected (connectivity solid green LED) and turns off the UE. At block 416, the RRU saves and applies the configuration, rebooting if needed. If at block 428 there is no connection, the RRU returns to the Management Interface at block 418 and repeats the process.

The installer 101 can get a message (text or web notification) informing him that the RRU has successfully connected to the CMS and is active.

As will be appreciated, there is no direct communication between the RRU and the installer's smartphone or other web interface application. The RRU's embedded UE will be turned off once the RRU can establish a connection to the CMS via the optical SFP or WiGig link.

It will be understood that each operation block of the illustrated flowcharts, and combinations of operation blocks in the flowcharts, can be implemented by computer program instructions. These program instructions can be provided to a processor to produce a machine, such that the instructions, which execute on the processor, create means for implementing the actions specified in the flowchart operation block or operation blocks. The computer program instructions can be executed by a processor to cause a series of operational steps to be performed by the processor to produce a computer-implemented process such that the instructions execute on the processor to provide steps for implementing the actions specified in the flowchart operation block or operation blocks. The computer program instructions can also cause at least some operational steps shown in the operation blocks of the flowcharts to be performed in parallel. Moreover, some steps can also be performed across more than one processor, such as in a multi-processor computer system or even a group of multiple computer systems. In addition, one or more operation blocks or combinations of operation blocks in the flowcharts can also be performed concurrently with other operation blocks or combinations of operation blocks.

Accordingly, operation blocks of the illustrated flowcharts support combinations for performing the specified actions, combinations of steps for performing the specified actions and program instruction for performing the specified actions. It will also be understood that each operation block of the flowcharts, and combinations of operation blocks in the flowcharts, can be implemented by special purpose hardware-based systems, which perform the specified actions or steps, or combinations of special purpose hardware and computer instructions. The foregoing example should not be construed as limiting and/or exhaustive.

FIGS. 5A-5F show application interfaces for a web application 120 for an installer 101 during an RRU 102 installation. In one embodiment of the present disclosure, user interfaces, other than user interfaces in FIGS. 5A-5F, can be employed without departing from the spirit and/or scope of the claimed subject matter. Such user interfaces can have more or fewer user interface elements that can be arranged in various ways. In another embodiment of the present disclosure, user interfaces can be generated using web pages, mobile applications, text messages, or the like. In another embodiment, CMS can include processes and/or API's for generating user interfaces as disclosed herein.

As shown in the FIGS. 5A-5F, the application can be configured as a web application 120 that can run on a personal computing device, such as a standard smart phone and operating system therefor (e.g.: iPhone/Android) or other mobile computing device. Computers can include virtually any portable personal computer capable of connecting to another computing device and receiving information such as, laptop computer, smart mobile telephone, and tablet computers and the like. However, portable computers are not so limited and can also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client computers typically range widely in terms of capabilities and features. Moreover, client computers can access various computing applications, including a browser, or other web-based application.

In one or more embodiments of the present disclosure, there is an RRU that supports a CRAN system where RRU and BBU functionality is split such that lower capacity Ethernet transport connectivity is possible between them. Such a RRU has integrated capability to interconnect BTS sites using wireless technology (in addition to fiber). Referring to the drawings and, in particular to FIG. 6A, there is an integrated RRU assembly or device generally represented by reference numeral 10. The RRU comprises the Node Manager 104, Install Mode Application 106, and embedded User Equipment including cellular connectivity as described herein. The RRU assembly 10 has integral antennas, such as GPS antennas 13 and beam antenna array 15, wireless self-interconnect facilities and Ethernet switch or switching 12. In one embodiment of the present disclosure, the RRU assembly 10 is configured to be a single unit, preferably compact, and for constructed for outdoor use. Thus, the single unit can be relatively readily supported on a building side or a pole Installation, by way of example.

In an embodiment device includes an Ethernet switch 12. The Ethernet switch 12 can be a multi-port device that can connect the RRU through a variety of means. These could be optical Ethernet, cabled/copper Ethernet, or the internal wireless interconnect circuitry.

The RRU includes a synchronization module 14. The RRU can retain synchronization in frequency and phase [time] through a variety of means. These can include GPS 1588v2, or other proprietary schemes.

Ethernet switching is a "connectionless" transport technology. This means that each packet of information traversing an Ethernet network carries with it the information needed to reach its destination (within its header). At each switching node in a network, the header is inspected and the packet is forwarded accordingly to the next connected node. As a new Ethernet flow is started, all the RRU switches participating in the flow "learn" about the flow and automatically forward/switch the associated packets on the virtual path that gets created for that flow (defined with dynamic switching tables that are maintained in each switching node, and shared with all other associated switching nodes). In this way, since each RRU comprises an Ethernet switch, and multiple RRUs within a cluster of RRUs (which have their own integrated Ethernet switching) can operate as a transport network so that packets are forwarded, or locally consumed (add-dropped) depending upon which RAN access cell the packet is are destined for.

By using Ethernet switching technology, clusters of the RRUs of the present disclosure can network themselves and transport information to/from the desired sites in which the information is required.

In an embodiment, the RRU can include a beamforming antenna array 15 configured to interface with the Ethernet switch 12. The beamforming antenna array 15 can comprise, for example, a millimeter wave antenna such as that employed in Phased Array (PA) radars, Multi-Function Radar (MFR), or steerable point-to-point (PtP) radio communication links. In one embodiment, each beamforming antenna can be configured to integrate multiple functions to a single antenna array. In another embodiment, the beamforming antenna array is multiplexed in time for multifunctionality. Variations can be associated with operation at different millimeter wave frequencies. In another embodiment, the electronic beamforming array is a 60 GHz 3×90 degree directional array for 360 degree electronic beamforming. However, the same concepts are directly applicable to any operating frequency above 10 GHz, where small electronically steerable antennas are possible. The beamforming array can be configured to scan for and track UEs, scan for and connect with other RRUs, and connect to a cluster anchor site for communication with a BBU.

The RRU assembly 10 comprises a Radio Access Network Digital Signal Processor RAN-DSP 16. The RAN-DSP 16 is configured to interface with a Multiple Input/Multiple Output (MIMO) Transceiver 21. The transceiver 21 is configured to output and received packet information for communication with other RRUs. Packet information can be passed to and from the MIMO transceiver 21 to the Ethernet switch 12 via the RAN DSP 16. Each RRU is capable of communicating as a wireless Ethernet network node. As described above, at each switching node in the network, the packet header can be inspected and the packet is forwarded to the next connected node until it reaches the correct RRU cell.

Figure 6B:
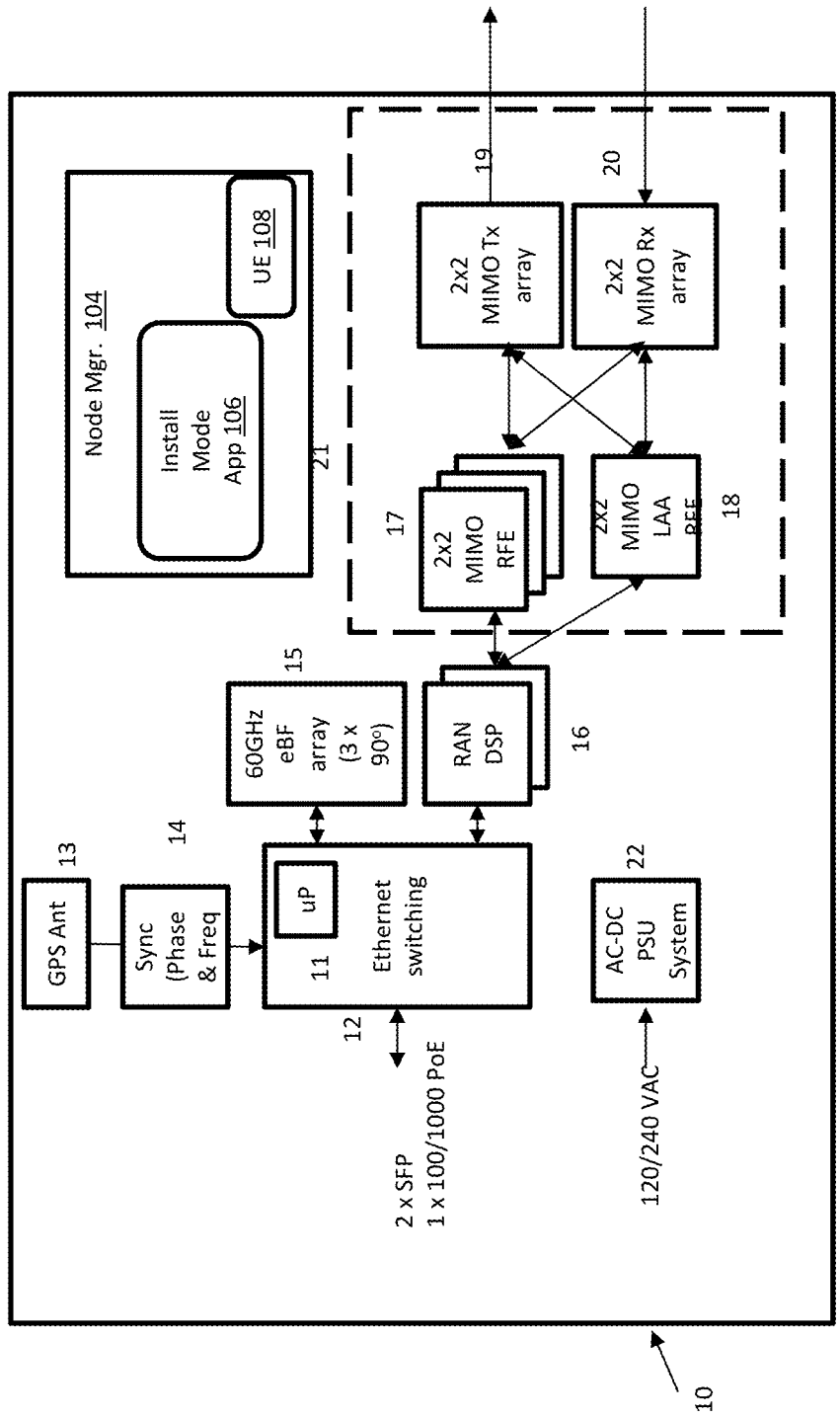

Referring to FIG. 6B, in one embodiment of the present disclosure, the Multiple Input/Multiple Output (MIMO) Transceiver 21 can comprise 2×2 Multiple Input/Multiple Output RFE 17, and 2×2 Multiple Input/Multiple Output (MIMO) LAA RFE 18. The MIMO RFE 17 and MIMO LAA RFE 18 each interface with a 2×2 MIMO Transmitter array 19 and a 2×2 MIMO Receiver array 20.

In another embodiment of the present disclosure, the RRU system or device 10 comprises an LTE-Release 13 Ready with SW upgrade option to 5G(NR), and is configured for:
LTE: 1 Gbps aggregation using 5 CCA (including LAA, 2×2 MIMO)
Support of LTE-FDD/TDD Modes
Auto discovery, Auto Configuration and Self Optimization on cloud platforms such as element management system (EMS)/self-organizing network (SON) cloud platforms
Compact Design to support building side/Pole Installation
10 Gb/s Wireless Fronthaul (at 60 GHz)
Fiber to Connect to a Cloud virtual BaseBand Unit.

The RRU system 10 is configured to package the information on a transport interface [Ethernet] that then allows each RRU to be networked such that each RRU can be connected to the next in a connectionless networking environment.

The lower capacities enable the use of wireless technology to realize the RRU-to-RRU interconnect links. By removing much of the fiber, and only using fiber to select locations, this is more cost-effective and feasible.

FIG. 7 is an example of an embodiment of a small-cell RRU cluster for a Radio Access Network. The system includes a plurality of RRU devices, namely 102-1, 102-2, 102-3, distributed in a cluster of small-cell subnets. As shown in FIG. 7, each device is deployed at street level and is dispersed to interconnect the cluster of RRU devices as described herein. For example, the cluster of RRU devices can be dispersed over a distance of 200-300 m. Each RRU cluster can be configured to provide, inter alia, high speed broadband coverage to mobile wireless UEs over a radius of 50-100 m. As will be appreciated, such an architecture can be deployed in tens to thousands of sites. The small-cell cluster RAN architecture can include a local PoP anchor site 107 configured to serve as a microcell subnet aggregation/connection to a PoP. Each RRU can be configured for UE tracking, and with cluster interconnection.

The small-cell cluster RAN architecture can include a local PoP Anchor site configured to serve as a microcell subnet aggregation/connection to a PoP.

In an embodiment of the present disclosure, one RRU device 102-1 is connected to a C-RAN, for example a BaseBand Unit (BBU), by a wired connection, such as an Ethernet fiber. The RRU 102-1 is configured to serve as aggregation site for the small cell cluster. The connection between the C-RAN and the RRUs 102-1, 102-2, 102-3 is configured as an advanced Radio over Ethernet (RoE).

In another embodiment of the present disclosure, the Anchor site is a mobile operator's local macro-RAN site 107. For example, an RRU 102-1 in the cluster has wireless connectivity (e.g. wireless Ethernet in E or V bands) to the local macro RAN site 107. The local macro RAN site 107 is connected to the RAN C-RAN and is configured to act as an aggregation site for the small cell cluster. Connection between the C-RAN and the RRUs 102-1, 102-2, 102-3 is by the local macro RAN site 107.

In an embodiment, the RRU has a beamforming antenna array 15 configured to interface with the Ethernet switch 12. The move to network densification translates into the use of a very high number of small cell cellular BTS locations, each with high capacity and short range. This increases the capacity-density of the cellular network in a way that can provide the envisioned capacities. In 5G, very high frequencies [millimeter wave, frequency >20 GHz] can be used for radio access to local, small cell Remote Radio Unit (RRU) base stations used in a Cloud Radio Access Network (C-RAN) architecture. The present disclosure has one or more embodiments of multi-functional electronic antenna array functionality for mobile networking applications, including 5G mobile networking applications. Electronically beamformed antenna technology provides millimeter wave technology for commercial spectrum cellular and mobile wireless networking technology, including for 5G mobile networking technology. The present disclosure describes embodiments of directional antennas that can be employed at millimeter wave frequencies. The directional antennas are electronically steerable so that they can search a substantially 2D area and engage/track mobile-user sessions in the field-of-view of the electronically steerable antenna.

These steerable antennas will have the ability to be controlled in time so that they can be pointed in specific directions at specific times. Multiple functions can be multiplexed onto the antenna in order to reduce the cost and hardware complexity of the RRU. The multiple functions include:

searching for new users in the scanning Field of View (FoV) of the antenna engaging and tracking existing/known users in the FoV of the antenna; and periodically pointing to the neighboring RRU site in the network to offload data/traffic into the network Accordingly, the present disclosure has embodiments of a beamforming antenna that is configured to integrate multiple functions to a single antenna. In one embodiment, the beamforming antenna is multiplexed in time for multifunctionality. Variations can be associated with operation at different millimeter wave frequencies. For example, in an embodiment, the system can perform a time-divided operational flow for the system components for the system architecture employing beam steering to facilitate multi-functions for the cluster.

The embodiments described herein are exemplary and should not be construed as implying any particular limitation on the present disclosure. It is understood by those skilled in the art that various modifications, combinations, sub-combinations and alterations may occur depending on design requirements and other factors insofar as they are within the scope of the present disclosure.

The invention claimed is:

1. A method for installing a Remote Radio Unit (RRU) comprising:

establishing a cellular IP connection between an embedded User Equipment (UE) of the RRU and a Central Management System;

tethering a node manager of the RRU to the embedded UE over a first interface, whereby the cellular IP connection is provided between the node manager and the Central Management System;

obtaining, by the node manager of the RRU, a configuration and an IP address for the RRU from the Central Management System;

directly connecting the RRU to the Central Management System via a network interface different from the first interface and the cellular IP connection between the node manager and the Central Management System; and verifying the network interface with the Central Management System.

2. The method of claim 1, further comprising:

disconnecting the cellular IP connection between the Central Management System and the embedded UE after directly connecting the RRU to the Central Management System via the network interface.

3. The method of claim 2, wherein the method comprises:

determining if an installer is connected via an Ethernet port of the RRU;

if not, establishing the cellular connection to the Central Management System.

4. The method of claim 1, wherein the Central Management System comprises a deployment manager application and a web application server, and the method further comprises establishing the cellular IP connection between the embedded UE and the deployment manager via the web application server.

5. The method of claim 1, wherein the method further comprises:

replacing a factory IP address of the RRU with the IP address obtained from the Central Management System.

6. The method of claim 1, further comprising:

accessing the Central Management System via an application on a portable client device;

obtaining, by a deployment manager, the IP address from a Dynamic Host Configuration Protocol (DHCP) Server;

updating a Central Management System database with the IP address.

7. The method of claim 1, further comprising:

statically assigning the IP address from a list of available addresses given by an operator.

8. The method of claim 1, further comprising:

determining if the RRU is configured for wireless connection to the Central Management System;

scanning to identify if there are one or more neighboring RRUs;

linking the RRU to the found neighboring RRUs, if any.

9. The method of claim 1, wherein the method comprises:

physically installing the RRU comprising the embedded UE and the node manager at a location.

10. A Remote Radio Unit (RRU) comprising:

a node manager; and an embedded User Equipment (UE);

wherein the embedded UE is configured to:

establish a cellular IP connection to a Central Management System, wherein the node manager is configured to:

tether to the embedded UE over a first interface, whereby the cellular IP connection is provided between the node manager and the Central Management System;

obtain a configuration for the RRU from the Central Management System;

obtain IP address for the RRU; and directly connect the RRU to the Central Management System via a network interface different from the first interface and the cellular IP connection between the node manager and the Central Management System.

11. The RRU of claim 10 wherein the RRU is further configured to scan to identify if there are one or more neighboring RRUs and link to the found neighboring RRUs.

12. The RRU of claim 10 wherein the RRU is configured to determine if an installer is connected via an Ethernet port of the RRU, and if not, establish the cellular connection to the Central Management System.

13. A system comprising:

a Central Management System comprising a deployment manager application and a database; and a Remote Radio Unit (RRU) comprising a node manager and an embedded User Equipment (UE);

wherein the embedded UE is configured to establish a cellular IP connection to the Central Management System; and wherein the node manager is configured to:

tether to the embedded UE over a first interface, whereby the cellular IP connection is provided between the node manager and the Central Management System;

obtain a configuration for the RRU from the Central Management System;

directly connect the RRU to the Central Management System via a network interface different from the first interface and the cellular IP connection between the node manager and the Central Management System; and verify the network interface with the Central Management System.

14. The system of claim 13 further comprising:
the Central Management System comprising a web application server configured to serve an installation application of a portable client device; and
the deployment manager application is configured to obtain, upon a request from the portable client device, the IP address from a Dynamic Host Configuration Protocol (DHCP) Server to obtain the IP address and update a Central Management System database with the IP address.

* * * * *